US009654675B2

(12) United States Patent
Kessler

(10) Patent No.: US 9,654,675 B2
(45) Date of Patent: May 16, 2017

(54) OPTICAL ATTACHMENT FOR DEVIATING FIELD OF VIEW

(71) Applicant: Kessler Optics & Photonics Solutions, Ltd., Rochester, NY (US)

(72) Inventor: David Kessler, Rochester, NY (US)

(73) Assignee: Kessler Optics & Photonics Solutions Ltd., Rochester, NY (US)

( * ) Notice: Subject to any disclaimer, the term of this patent is extended or adjusted under 35 U.S.C. 154(b) by 185 days.

(21) Appl. No.: 14/658,346

(22) Filed: Mar. 16, 2015

(65) Prior Publication Data

US 2015/0281530 A1    Oct. 1, 2015

Related U.S. Application Data

(60) Provisional application No. 61/970,063, filed on Mar. 25, 2014.

(51) Int. Cl.
| | | |
|---|---|---|
| H04N 5/225 | (2006.01) | |
| G03B 17/17 | (2006.01) | |
| H04N 5/232 | (2006.01) | |
| G03B 17/56 | (2006.01) | |

(52) U.S. Cl.
CPC ........... *H04N 5/2254* (2013.01); *G03B 17/17* (2013.01); *G03B 17/565* (2013.01); *H04N 5/23293* (2013.01)

(58) Field of Classification Search
CPC ..... H04N 5/2254; G03B 17/17; G03B 17/565
USPC ....... 348/360, 375; 396/384, 448; 455/556.1
See application file for complete search history.

(56) References Cited

U.S. PATENT DOCUMENTS

| | | | | | |
|---|---|---|---|---|---|
| 3,833,291 | A | * | 9/1974 | Samuelson | ............ G03B 17/12 359/834 |
| 4,684,224 | A | * | 8/1987 | Yamashita | ............ G02B 17/04 359/735 |
| 6,635,010 | B1 | * | 10/2003 | Lederer | ................ G02B 23/243 600/171 |
| 7,142,231 | B2 | * | 11/2006 | Chipchase | ........ H04M 1/72522 348/14.02 |

(Continued)

FOREIGN PATENT DOCUMENTS

| | | | |
|---|---|---|---|
| JP | 2005332126 A | * | 12/2005 |
| JP | 2014011642 A | * | 1/2014 |
| WO | WO 00/49448 A1 | * | 8/2000 |

OTHER PUBLICATIONS

"Half-Penta Prisms"; Edmund Optics, Jul. 29, 2013; <http://edmundoptics.com/optics/prisms/image-rotation-prisms/half-penta-prisms/3249>; obtained via archive.org.*

*Primary Examiner* — John Villecco
(74) *Attorney, Agent, or Firm* — Louis S. Horvath

(57) ABSTRACT

A field of view deviator apparatus for a camera lens housing on a personal communications device has a coupling that seats a removable element in a position adjacent to the camera lens and a field of view deviator prism that seats in the coupling and defines a path for image-bearing light from the subject scene to the camera lens having a first transmissive surface that is at a sufficiently oblique angle to the defined path of image-bearing light within the prism for total internal reflection, a second transmissive surface that is substantially at a normal to the defined path of incident image-bearing light within the prism; and a first reflective surface that folds the defined path of image-bearing light within the prism.

19 Claims, 25 Drawing Sheets

(56) References Cited

U.S. PATENT DOCUMENTS

| | | | |
|---|---|---|---|
| 7,388,516 B2* | 6/2008 | Yokota | G08G 1/005 340/435 |
| 8,953,841 B1* | 2/2015 | Leblang | G06K 9/00671 345/633 |
| 9,019,420 B2* | 4/2015 | Hurst | H04M 1/0264 348/337 |
| 2002/0091305 A1* | 7/2002 | Lederer | G02B 23/2423 600/171 |
| 2005/0146600 A1* | 7/2005 | Chipchase | H04M 1/72522 348/14.02 |
| 2010/0328420 A1 | 12/2010 | Roman | |
| 2011/0081946 A1* | 4/2011 | Singh | H04M 1/0264 455/556.1 |
| 2012/0050888 A1 | 3/2012 | Dai et al. | |
| 2012/0262582 A1* | 10/2012 | Kimchi | H04M 1/72569 348/159 |
| 2013/0011127 A1* | 1/2013 | Lawton | G02B 13/06 396/71 |
| 2013/0231157 A1* | 9/2013 | Chung | H04M 1/0264 455/556.1 |
| 2013/0293586 A1* | 11/2013 | Kaino | G08G 1/005 345/633 |
| 2013/0329115 A1* | 12/2013 | Palmeri | A45C 11/00 348/335 |
| 2014/0078389 A1* | 3/2014 | Merz | H04N 5/2252 348/375 |
| 2014/0085334 A1* | 3/2014 | Payne | H04M 3/42382 345/633 |
| 2014/0171150 A1 | 6/2014 | Hurst et al. | |
| 2014/0228073 A1* | 8/2014 | Fratti | H04W 4/026 455/556.1 |
| 2014/0232930 A1* | 8/2014 | Anderson | G03B 17/565 348/369 |
| 2014/0300466 A1* | 10/2014 | Park | G08B 19/00 340/539.11 |
| 2014/0313377 A1 | 10/2014 | Hampton | |
| 2015/0015780 A1* | 1/2015 | Graham | H04N 5/2252 348/376 |
| 2015/0062416 A1* | 3/2015 | Vance | G03B 17/17 348/369 |
| 2015/0123992 A1* | 5/2015 | Mahan | G06T 11/60 345/629 |
| 2015/0220766 A1* | 8/2015 | Russell | G06K 7/10881 235/462.42 |
| 2015/0237241 A1* | 8/2015 | Wilson | H04N 5/2254 348/36 |
| 2015/0264238 A1* | 9/2015 | Hurst | H04M 1/0264 348/369 |
| 2015/0365574 A1* | 12/2015 | Lai | H04N 5/247 348/222.1 |

* cited by examiner

Maximum FOV in the vertical direction, in degrees, as a function of the refractive index of the Littrow prism

| FOV | n |
|---|---|
| 47.426 | 1.45 |
| 49.168 | 1.5 |
| 52.688 | 1.6 |
| 54.468 | 1.65 |
| 56.263 | 1.7 |
| 58.072 | 1.75 |
| 59.898 | 1.8 |

FIG. 4D

Maximum FOV in the vertical direction, in degrees, as a function of the refractive index of the half-pentaprism

| FOV | n |
|---|---|
| 48.105 | 1.45 |
| 49.875 | 1.5 |
| 53.453 | 1.6 |
| 55.264 | 1.65 |
| 57.089 | 1.7 |
| 58.931 | 1.75 |
| 60.789 | 1.8 |

FIG. 6D

OPTICAL ATTACHMENT FOR DEVIATING FIELD OF VIEW

CROSS REFERENCE TO RELATED APPLICATIONS

This application claims the benefit of U.S. Provisional Application Ser. No. 61/970,063 entitled "Optics Means for Walking and Texting" by David Kessler, filed 25 Mar. 2014 and incorporated herein in its entirety.

FIELD OF THE INVENTION

The invention relates generally to mobile imaging apparatus and more particularly to an optical attachment that deviates the field of view to provide a more comfortable viewing angle for imaging.

BACKGROUND OF THE INVENTION

Many types of personal portable electronic devices used for wireless communication, including cellular phones, electronic tablets, internet appliances, and similar devices have a display surface and a back surface opposite the display surface. The back surface typically houses a built-in camera, designed using low-profile optics that typically include lens elements with an objective lens that is at least slightly recessed from the back surface. The camera can be used to capture still or video images. The portable electronic communications device can include the capability for continuous video display, allowing the user to record motion content or simply to view objects in the field of view of the camera lens.

The view angle can be awkward, however. With portable communications devices, it would be desirable to acquire still or video images without the requirement that the device be held in a substantially vertical orientation. This can be the case, for example, where the viewer does not want to obstruct the scene, including obstructing portions of the scene for the viewer or for others. The viewer may not want to disturb the scene or to disturb viewed subjects by holding the personal communications device at an awkward vertical angle.

Another problem with the awkward angle of the built-in camera relates to how the display is generally used. Personal communications device users, for example, can often be seen viewing or manipulating the display while walking, taking advantage of free time to send or view email messages, send text messages, browse the internet, or use any of a number of available applications available with the device. Various applications have been identified to provide this content, so that, during this activity, video content, playing in the background of the display screen, can help the user to have at least a partial view of what may lie just ahead. Hopefully, this partial video content can help to prevent injury or mishap as the viewer's attention is focused on the display and not on the travel path, sidewalk, or structures ahead. Unfortunately, these existing applications require holding the camera at the proper angle, which is generally vertical and not the most usable or comfortable angle for texting and display manipulation.

There have been a number of attempts to alleviate this problem and allow the user to use the camera at a more suitable angle for viewing the subject and at a more suitable angle for walking while viewing the display. U.S. Patent Application Publication US 2014/0171150 A1 by Hurst et al. is one example that adds an optical component to the imaging path for this purpose. However, the proposed solutions for deviating the field of view shown by Hurst et al. '1150 and others have been shown to be unsatisfactory for a number of reasons:
  (i) Poor image quality, with problems including distortion, ghosting, obscured field of view, and chromatic aberration including lateral color.
  (ii) Image field reversal, so that the image scene is "upside down" at the camera, requiring an added software application on the personal communications device and requiring logic processing and memory resources to reverse the received video image content for display.
  (iii) Awkward use, with solutions ranging from added components attached to device packaging to devices mounted on separate attachments. A low profile is preferable, with additional components requiring minimal storage space and handling for positioning.
  (iv) Excessive pupil size. A 2-3 mm or smaller pupil size is compatible with the typical camera that is integral to a cell phone or other hand-held device. Existing designs provide a pupil size that is overly large, such as 8-12 mm Using such a poorly matched pupil size limits the field of view and takes up space not needed for imaging.
  (v) Limited field of view (FOV). A field of view approaching at least 60 degrees in the vertical direction would be advantageous.

Thus, it would be beneficial to have apparatus that allow deviation of the field of view for a smartphone or other handheld communications device for more usable view angle, while maintaining good image quality and a compact dimensional profile.

SUMMARY OF THE INVENTION

The present disclosure is directed to overcoming one or more of the problems set forth above and advance the art of imaging for personal portable electronic devices. Advantageously, embodiments of the present disclosure provide solutions that allow deviation of the field of view for the integrated camera without requiring image reversal and without compromising camera image quality and the field of view of the device.

These and other objects, features, and advantages of the present invention will become apparent to those skilled in the art upon a reading of the following detailed description when taken in conjunction with the drawings wherein there is shown and described an illustrative embodiment of the invention.

According to an aspect of the present disclosure, there is provided a field of view deviator apparatus for a camera lens housing on a personal communications device, comprising:
  a coupling that seats a removable element in a position adjacent to the camera lens; and
  a field of view deviator prism that seats in the coupling and defines a path for image-bearing light from the subject scene to the camera lens having:
  (i) a first transmissive surface that is at a sufficiently oblique angle to the defined path of image-bearing light within the prism for total internal reflection,
  (ii) a second transmissive surface that is substantially at a normal to the defined path of incident image-bearing light within the prism; and
  (iii) a first reflective surface that folds the defined path of image-bearing light within the prism.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

FIG. 4D is a table showing computed field of view values for different indices of refraction.

FIG. 6D is a table showing computed field of view values for different indices of refraction.

DETAILED DESCRIPTION OF THE INVENTION

Figure 1:
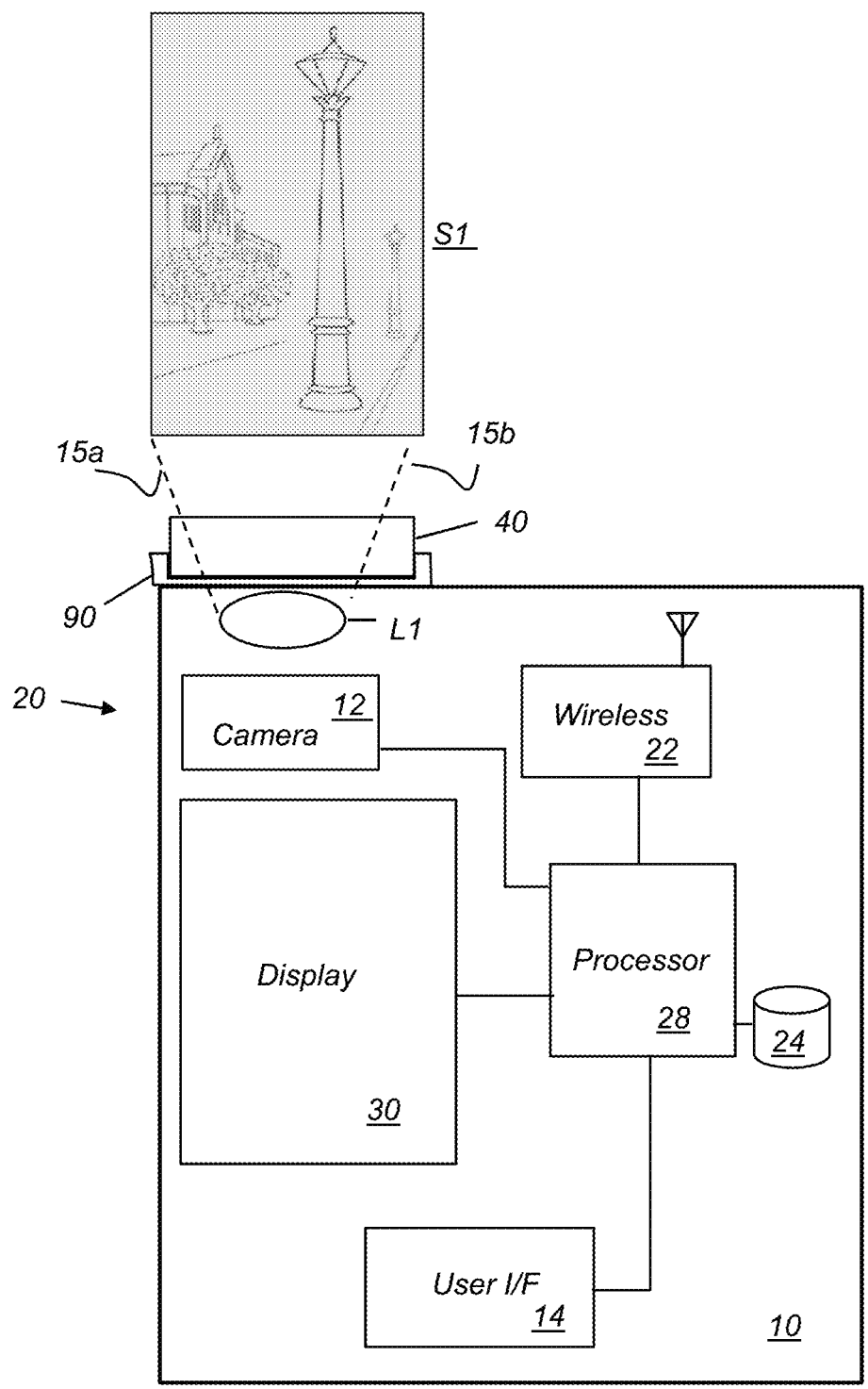
FIG. 1 is a schematic block diagram that shows components of a personal communications device according to an embodiment of the present disclosure.

The present description is directed in particular to elements forming part of, or cooperating more directly with, apparatus in accordance with the invention. It is to be understood that elements not specifically shown or described may take various forms well known to those skilled in the art.

Where they are used herein, the terms "first", "second", and so on, do not necessarily denote any ordinal, sequential, or priority relation, but are simply used to more clearly distinguish one element or set of elements from another, unless specified otherwise.

In the context of the present disclosure, the terms "viewer", "operator", "observer", and "user" are considered to be equivalent and refer to the person who uses the personal portable electronic device.

In the context of the present disclosure, the general term "personal portable communications device" or, more simply, "personal communications device" or "portable communications device" or "handheld communications device" is broadly used to encompass any of a number of types of wireless mobile or portable personal communications devices that are carried by a user and include a camera and a display that shows images acquired by the camera, including cellular phones, so-called "smartphones" that provide some type of mobile operating system with image capture and display, feature phones having at least some measure of computing and display capability, and various types of wireless, networked electronic pads, tablets, and similar devices that include a camera and a display area capable of displaying text and graphic content and, optionally, a mechanism for entering data, such as phone numbers, message text, and prompt responses, on the display screen, for example. The mechanism for data entry typically includes a touch screen and may also include a keypad. Examples of types of personal communications devices that can be used with embodiments of the present disclosure include smartphones such as the Android™ smartphone platform (Android is a trademark of Google, Inc.), the iPhone (from Apple Inc.), and devices with similar capability for image acquisition and display, optionally including the capability for downloading and executing one or more sets of programmed instructions, such as software applications that are widely referred to as "apps" that display on the device. The term "handheld", as used in the context of the present disclosure, is used in a generic sense, descriptive of device size and typical use. A handheld device is not limited to use only when couched in the hand of a user. Thus, for example, a laptop computer or computer tablet can be considered as handheld devices in the context of the present disclosure, even though they can often be used on a tabletop or floor or cradled on the user's lap.

In the context of the present disclosure, the term "app" is considered to be synonymous with the phrase "software application" or "software application program" and relates to a set of one or more programmed instructions that execute on a computer or other logic processor, such as the logic processor that controls operation of a smartphone or other person communications device. The personal communications device has a particular wireless address, typically a phone number, but optionally some other type of wireless address.

As used herein, the term "energizable" relates to a device or set of components that perform an indicated function upon receiving power and, optionally, upon receiving an enabling signal.

The term "actuable" has its conventional meaning, relating to a device or component that is capable of effecting an action in response to a stimulus, such as in response to an electrical signal, for example.

The term "set", as used herein, refers to a non-empty set, as the concept of a collection of elements or members of a set is widely understood in elementary mathematics. The term "subset", unless otherwise explicitly stated, is used herein to refer to a non-empty proper subset, that is, to a subset of the larger set, having one or more members. For a set S, a subset may comprise the complete set S. A "proper subset" of set S, however, is strictly contained in set S and excludes at least one member of set S. Two subsets that have no elements in common are disjoint.

In the context of the present disclosure, the term "oblique" means at an angle that is not an integer multiple of 90 degrees. Two lines, linear structures, or planes, for example, are considered to be oblique with respect to each other if they diverge from or converge toward each other at an angle that is at least about 5 degrees or more away from parallel, or at least about 5 degrees or more away from orthogonal.

A light path is considered to be substantially at a normal at incidence to an exit or entrance surface if the majority of the light that transits that surface is within about +/−12 degrees of normal, such as within about +/−5 degrees of normal.

In the context of the present disclosure, the term "coupled" is intended to indicate a mechanical association, connection, relation, or linking, between two or more components, such that the disposition of one component affects the spatial disposition of a component to which it is coupled. For mechanical coupling, two components need not be in direct contact, but can be linked through one or more intermediary components.

Tunnel diagrams are used for prism analysis in the description that follows. The tunnel diagram, familiar to those skilled in the optical prism design arts, is generated by tracing the path of a light beam as it travels, relative to an optical axis, through the prism. The tunnel diagram begins with a flat plan view of the prism as a first section, then adds successive sections by "unfolding" the prism plan each time light encounters a reflecting surface. The prism shape is replicated along each incident reflecting surface. Successive unfolding allows a tracing of the optical path in a straightforward, intuitive manner, effectively "flattening" the path of light that can otherwise be confusing to understand in three dimensions.

Embodiments of the present disclosure provide solutions that allow use of the personal communications device and viewing of its display while walking, with the camera video displayed concurrently with other displayed content from an application executed by the device, including text information or symbols, for example. Embodiments of the present disclosure further provide solutions that allow the user to view a subject directly while acquiring video or still images of the subject, without the requirement that the personal communications device lies in the direct line-of-sight of the user during image acquisition. Stated differently, image acquisition and aiming of the camera can be effected without the need for the camera to be held up to the viewer's face.

FIG. 1 is a block diagram that shows components of an optical apparatus 20 within a personal communications device 10 according to an embodiment of the present disclosure. Personal communications device 10 has a display 30 that is driven from a processor 28 that executes software instructions from one or more applications and is in signal communication with display 30 and a memory 24. Processor 28 is also in signal communication with a wireless communications circuit 22 that provides two-way wireless communication with external processors for downloading messages and software applications and uploading messages and image content. Processor 28 is also in signal communication with a user interface 14 that provides viewer instructions and allows features such as command and text entry. User interface 14 is typically a touch screen and may also include a keypad or other alphanumeric entry device. A camera 12 acquires image content of a subject scene S1 over a field of view having a boundary outlined by lines 15a and 15b in the example shown and can operate in both still imaging and video imaging modes. One example of a typical camera 12 lens design that can be used for personal communications device 10 is shown, for example, in US Patent Application Publication No. US 2012/0050888, entitled "Micro Camera Lens" by Dai et al. Typical of lenses used for personal communications devices 10, the Dai et al. lens has an effective focal distance of 2.7 mm and is at F/2.3, with an entrance pupil of about 1.2 mm. A lens L1, which typically includes one or more lens elements, is used for directing light from the optical object, subject scene S1.

FIG. 1 also shows a field of view deviator apparatus 40, which can include a prism or other optical component that deviates the field of view that includes scene S1 as described in more detail subsequently. Field of view deviator apparatus 40 has a prism that seats in a coupling 90 that allows field of view deviator apparatus 40 to be removably positioned in front of the camera 12 lens.

Figure 2:
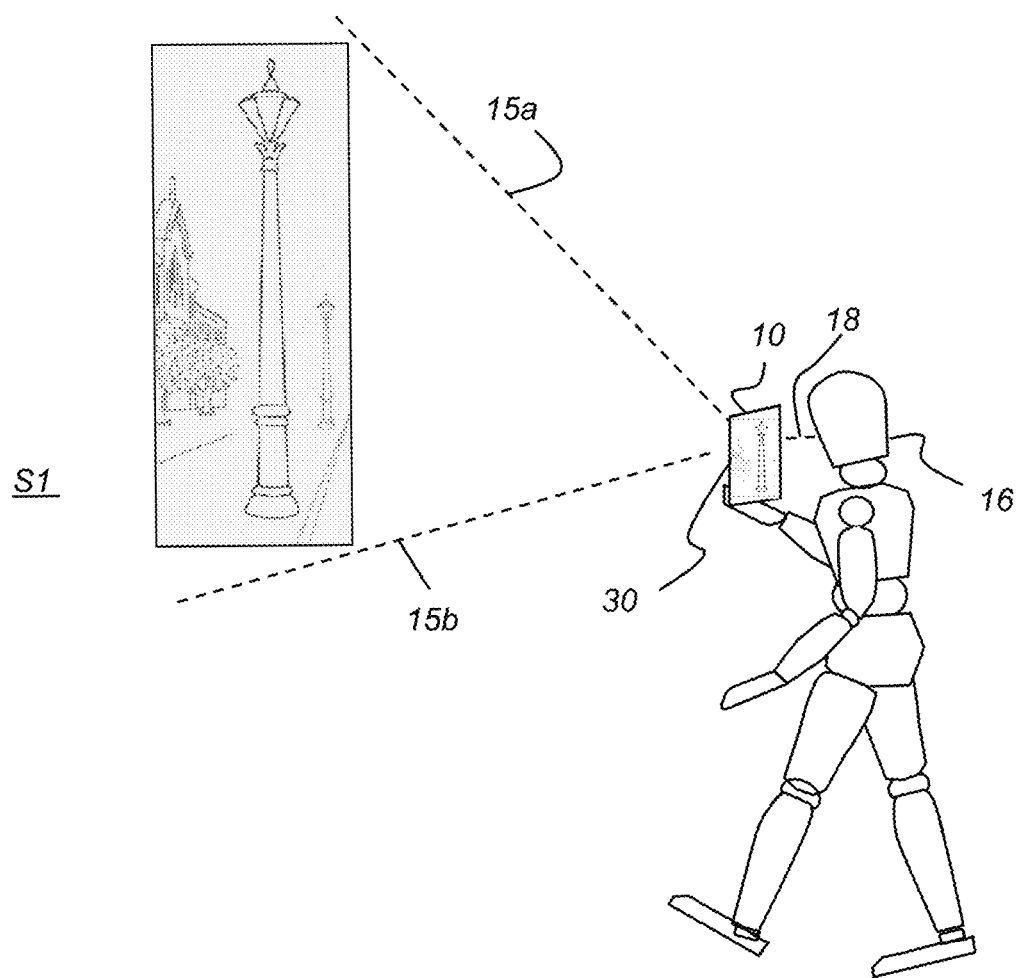
FIG. 2 is a diagram that shows conventional imaging of a scene using a personal communications device.

FIG. 2 shows the difficulty inherent to conventional design of personal communications device 10 when field deviation is not used. A viewer 16 can view video content of scene S1 with a field of view (FOV) extending from lines 15a to 15b while walking and while texting or otherwise viewing display 30. However, acquisition of scene S1 content, in either video or still mode, requires the viewer 16 to hold personal communications device 10 in a generally upright position, at a vertical, obstructing the view of viewer 16. It is recognized that this posture is not only awkward, but can be potentially hazardous, since viewer 16 may not see obstructions or sudden changes in terrain that could cause problems or injury. As indicated by a dashed line of sight 18, viewer 16 has eyes generally fixed on display 30, so that actually viewing scene S1 would require viewer 16 to move personal communications device 10 out of view to see scene S1 or objects or to observe and anticipate terrain features that lie along the path of motion.

Figure 3A:
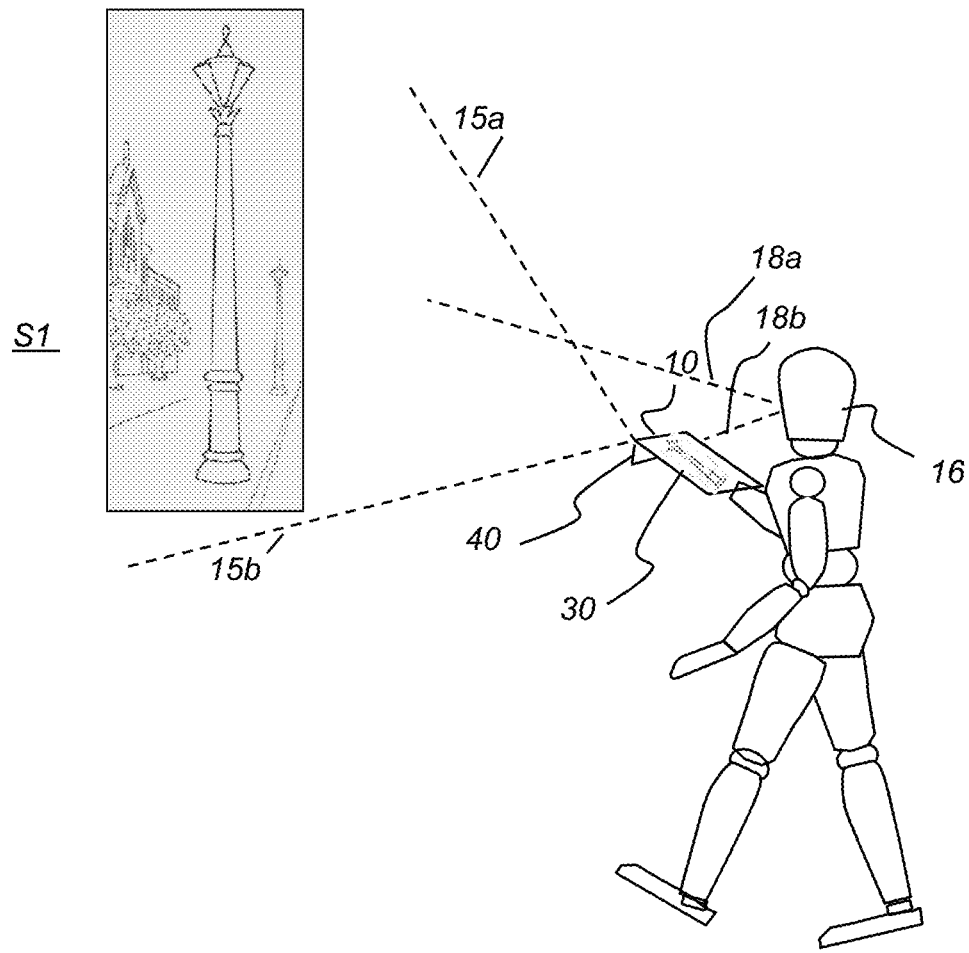
FIG. 3A is a diagram that shows imaging of a scene using a personal communications device according to an embodiment of the present disclosure.

FIG. 3A shows how the use of field of view deviator apparatus 40 changes viewer 16 behavior and affords enhanced visibility of the scene S1. Viewer 16 now has alternate lines of direct sight 18a and 18b for scene S1 and ambient surroundings as well as viewing the field of view outlined between dashed lines 15a and 15b on display 30. Personal communications device 10 is now held at an angle, allowing not only a more comfortable posture, but also providing a better view of the surroundings.

Figure 3B:
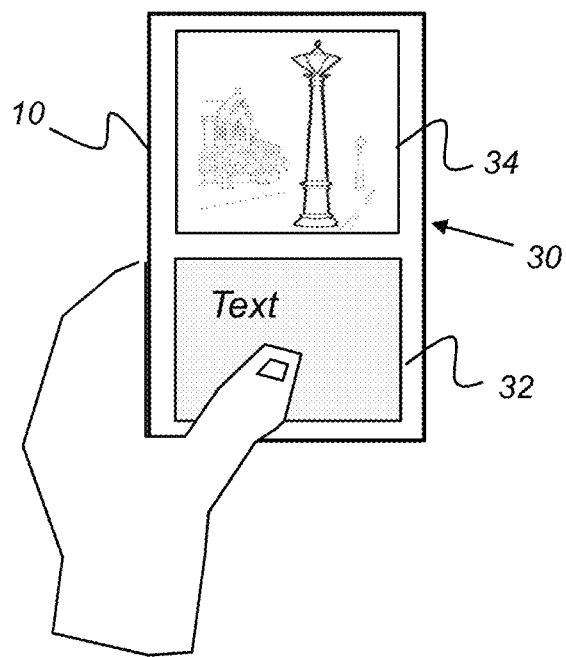
FIG. 3B is a view of the display shared between acquired video and application content.
Figure 3C:
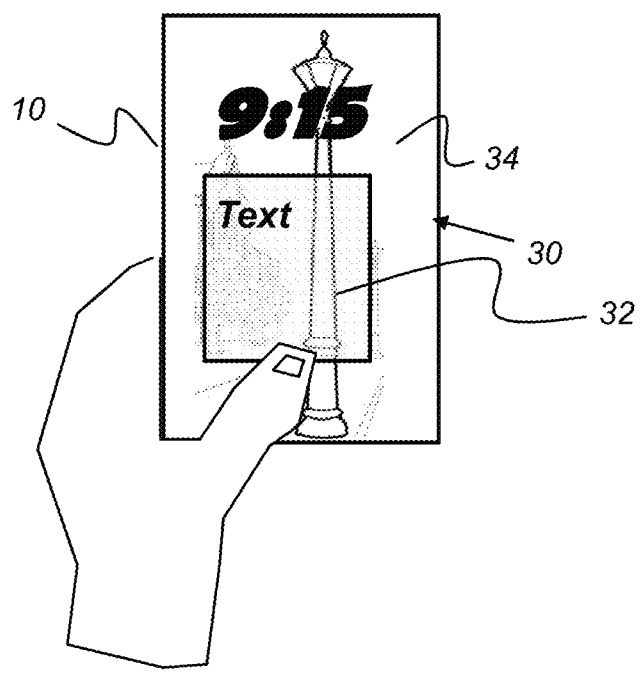
FIG. 3C is a view of the display shared between acquired video and overlaid application content.

FIGS. 3B and 3C show different arrangements of an application space 32 and video content 34 on display 30. In FIG. 3B, video content 34 occupies one portion of display 30 and application space 32 occupies another portion of display 30. In FIG. 3C, video content 34 displays as the background of display 30, with applications space 32 overlaid and, optionally, partially transparent to allow at least some visibility of the underlying video content 34. Various applications or apps are readily available from networked sites to provide this partially transparent screen behavior in conjunction with the optical apparatus 20 (FIG. 1) of the present disclosure for devices such as smartphones, for example.

A number of designs for field of view deviation devices have been proposed, but fail to provide sufficient image quality and FOV, with appropriate pupil size, low dimensional profile, and ease of use. Notably, existing designs invert the image and thus require additional software to correct the orientation of scene content for display. Deviating prisms that have been disclosed are positioned at angles that cause dispersion and other aberrations and invert the scene content, requiring software and dedicated computational resources for correcting image orientation on the display. Embodiments of the present disclosure use a small deviating prism of either of two types that provide an image that has the correct, non-inverted orientation and that eliminates or minimizes dispersion, with features that correct for ghosting and other problems that plague existing solutions.

Embodiments of the present disclosure provide a field of view deviator prism that fits over the recessed camera lens on a personal communications device and that defines a path for image-bearing light from the subject scene. The field of view deviator prism has two transmissive surfaces and one reflective surface. One of the transmissive surfaces is at a sufficiently oblique angle to the defined path of image-bearing light so that it provides total internal reflection (TIR); the other transmissive surface simply transmits the image-bearing light. The image-bearing light is incident twice on one of the two transmissive surfaces and is reflected twice within the prism. By providing two reflections within the body of the prism, once from TIR and once from the reflective surface, the field of view deviator prism of embodiments of the present disclosure provide the image of a scene correct vertical orientation, rather than upside-down. Different configurations of the field of view deviator prism can be used, so that the transmissive+TIR surface can be either the entry surface or the exit surface, depending on the configuration.

TIR is well known to those skilled in the optical arts and skilled in using optical prisms for folding light paths. A sufficiently oblique incident angle, greater than a "critical angle" is needed within the prism in order to cause TIR. For example, for a typical glass-air interface and with visible light, the critical angle is about 41.2 degrees.

Figure 4A:
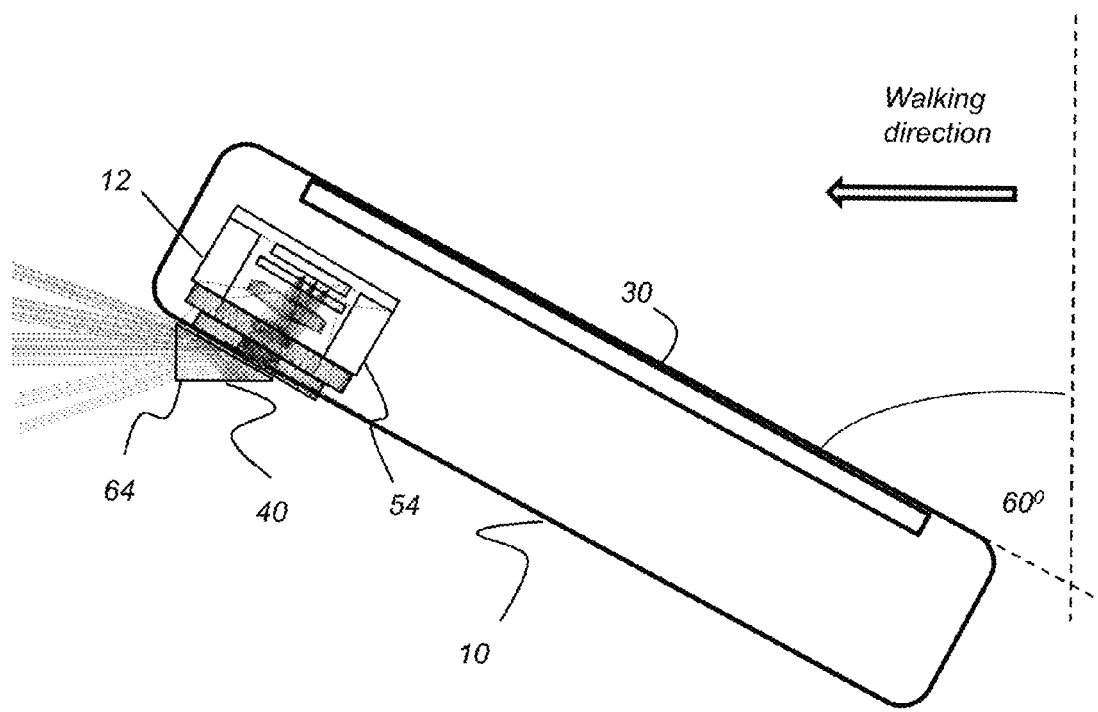
FIG. 4A is a side view of a personal communications device having a field of view deviator according to an embodiment of the present disclosure.
Figure 4B:
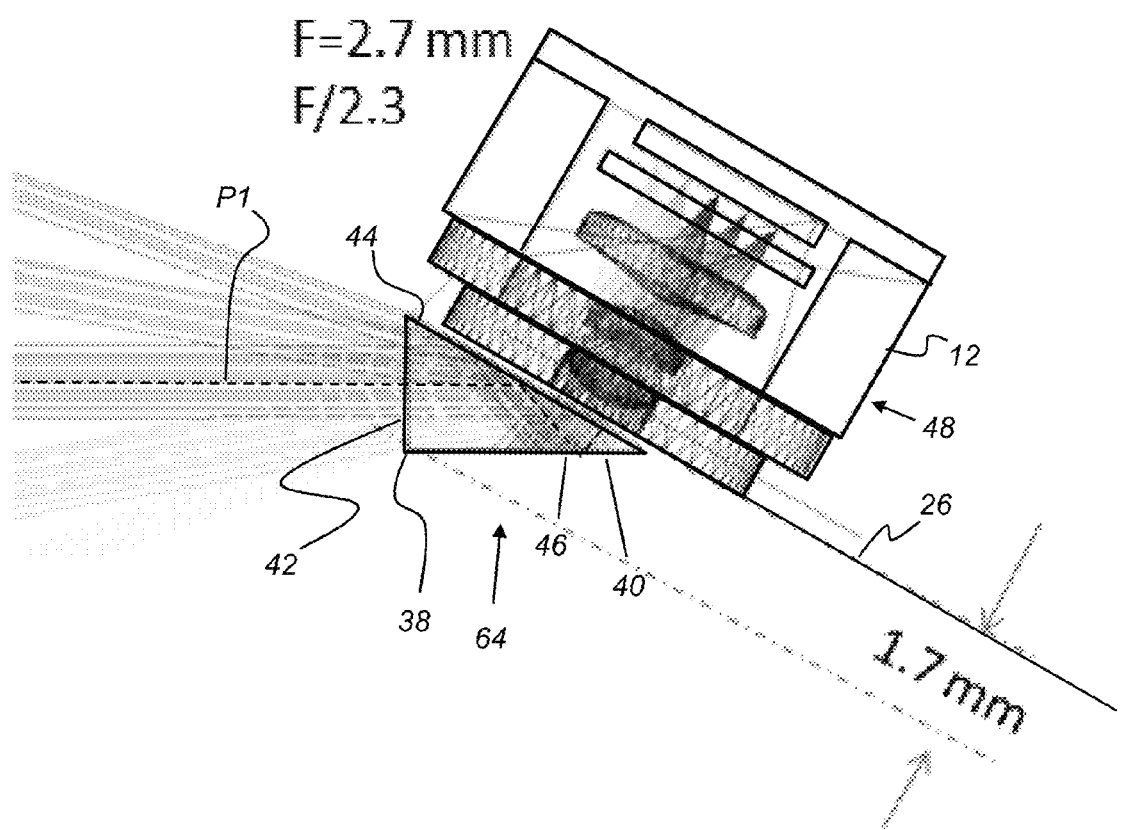
FIG. 4B is an enlarged side view that shows the field of view deviator as mounted in front of the camera lens.

According to an embodiment of the present disclosure, a Littrow prism 64 is used as part of field of view deviator apparatus 40, as shown in FIG. 4A and in enlarged form as disposed before a camera lens 48 in FIG. 4B. The camera 12 is disposed within a camera housing 54 in personal communications device 10. The Littrow prism 64 is a 30-60-90 degree prism in cross section and can be configured as a suitable match for lenses such as that taught in the previously mentioned Dai et al. disclosure. The Littrow prism is conventionally known as a type of retro-reflecting dispersing prism in various applications, with its surfaces arranged so that an incident light beam at the Brewster angle undergoes minimal deviation and maximum dispersion. For beam deviation, the surface opposite the 60 degree angle typically has a reflective coating and can be arranged to provide an erect image. The prism size is determined by the camera entrance pupil diameter and desired FOV. Advantageously, the Littrow prism 64 does not introduce aberrations, since the incoming beams are essentially collimated. A prism entry surface 42 and exit surface 44 are anti-reflection (AR) coated. In an embodiment of the present disclosure, a portion of a bottom surface 46 is reflection coated, since angles of incident light are not sufficient for total internal reflection (TIR) along that surface. In an embodiment of the present disclosure, a portion of bottom surface 46 is modified from the conventional Littrow arrangement and provided with a light absorbing treatment, as described subsequently. A projecting corner 38 can be rounded or otherwise smoothed.

As is noted in FIG. 4A, the holding angle for personal communications device 10 outfitted with the Littrow prism 64 in field of view deviator apparatus 40 is 60 degrees from vertical. According to an embodiment of the present disclosure, prism height, taken from near a back surface 26 of personal communications device 10, is about 1.7 mm.

FIG. 4B shows a path P1 that is defined for incoming image-bearing light from the subject scene S1 (FIG. 1) that is diverted toward camera 12 as outgoing light by field of view deviator apparatus 40 configured using a Littrow prism 64. Light path P1 is incident to Littrow prism 64 along two transmissive surfaces, entry and exit surfaces 42 and 44, and at one reflective surface, bottom surface 46. As path P1 shows, there are two reflections of the light provided from the field by Littrow prism 64 when used in field of view deviator apparatus 40. A first reflection is due to Total Internal Reflection (TIR) from exit surface 44 in the FIG. 4B configuration. A second reflection folds light path P1 due to treatment provided to a portion of bottom surface 46 such as due to reflective material deposited on or applied against bottom surface 46, such as a mirrored coating or a multilayer dichroic coating, for example. Exit surface 44 is substantially at a normal to light path P1 for outgoing light.

The tunnel diagram, a familiar tool to those skilled in the prism arts, shows why the Littrow prism is superior to conventional prism designs, such as those taught in Hurst et al. 1150 and elsewhere. When input and output surfaces of the tunnel diagram are in parallel, the optical path within the prism is relatively free of dispersion and other angle-related aberrations.

Figure 4C:
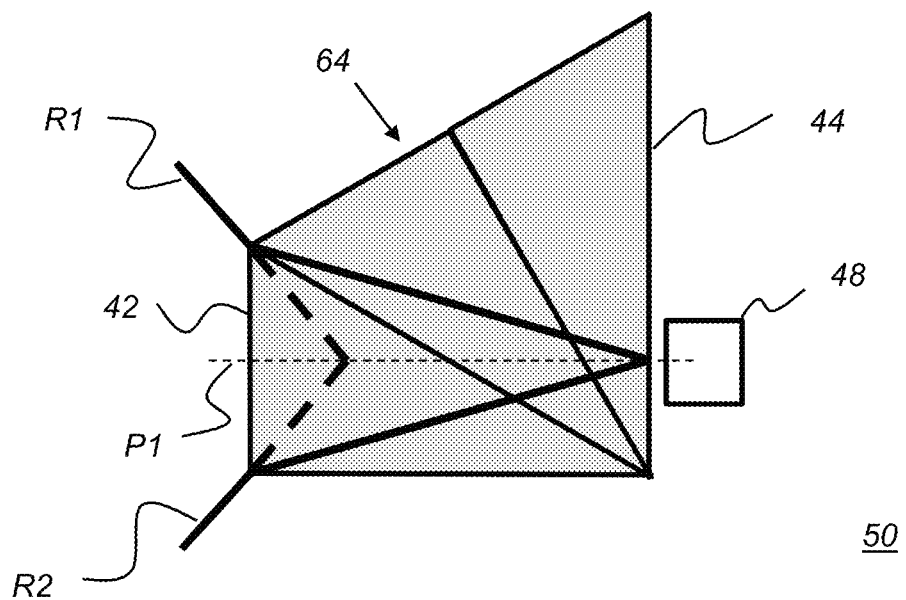
FIG. 4C is a tunnel diagram that shows a Littrow prism used as the field of view deviator.

FIG. 4C shows a tunnel diagram 50 of the Littrow prism 64 that shows the optically parallel relationship of transmissive entry and exit surfaces 42 and 44 for incoming and outgoing light, respectively, and is used to calculate the vertical FOV. Chief rays R1 and R2 indicate the 50% vignetting level of the FOV and are traced in diagram 50 toward camera lens 48.

The maximum FOV of the Littrow prism 64 depends, in part, on its refractive index n. With a high-index glass such as S-Lam66 with an index n of about 1.8, an FOV of 59.9 degrees can be achieved in a vertical direction. The FOV in the horizontal direction is not limited by the prism since the prism can be made as long as needed in this direction. With polystyrene, having index n close to 1.6, the maximum FOV is 52.7 degrees.

The table in FIG. 4D shows calculated values of prism vertical field of view in air as a function of the prism refractive index for the Littrow prism design of FIGS. 4A-4C.

The use of an erect-image or "image upright" prism such as the reflective-coated Littrow prism to deviate the FOV has the advantage of not altering the parity of the scene, so that software is not needed to correct for image parity and reconstruct the image so that it is right-side up. This is the case because the Littrow prism provides an even number of reflections of image-bearing light. This distinguishes the Littrow-based design of FIGS. 4A-4C from other types of prism designs as well as from designs that position one or more mirrors in the imaging path.

The tunnel diagram 50 of FIG. 4C clearly shows the imaging advantage of the Littrow design over conventional prism solutions. With respect to the image-bearing light, entry surface 42 and exit surface 44 are optically parallel to each other, as the tunnel diagram 50 represents. This means that there would be no field induced angular color dispersion. As is well known to those skilled in the imaging arts, use of a prism whose tunnel diagram shows non-parallel input and output surfaces will introduce severe aberrations of distortion and of lateral color at the camera 12, causing misregistration of the red, green, and blue spectral content of the image. These effects are avoided in the Littrow prism embodiment that is shown in FIGS. 4A-4C. Here, the effect of the Littrow prism on the captured image, with the image-bearing light reflected twice, is the same as that of a thin window glass.

As the tunnel diagram of FIG. 4C shows, light that is incident along path P1 at a normal to the light entry surface 42 of the field of view deviator apparatus using the Littrow prism exits the field of view deviator apparatus at a normal to the light exit surface 44 of the field of view deviator apparatus.

Figure 4E:
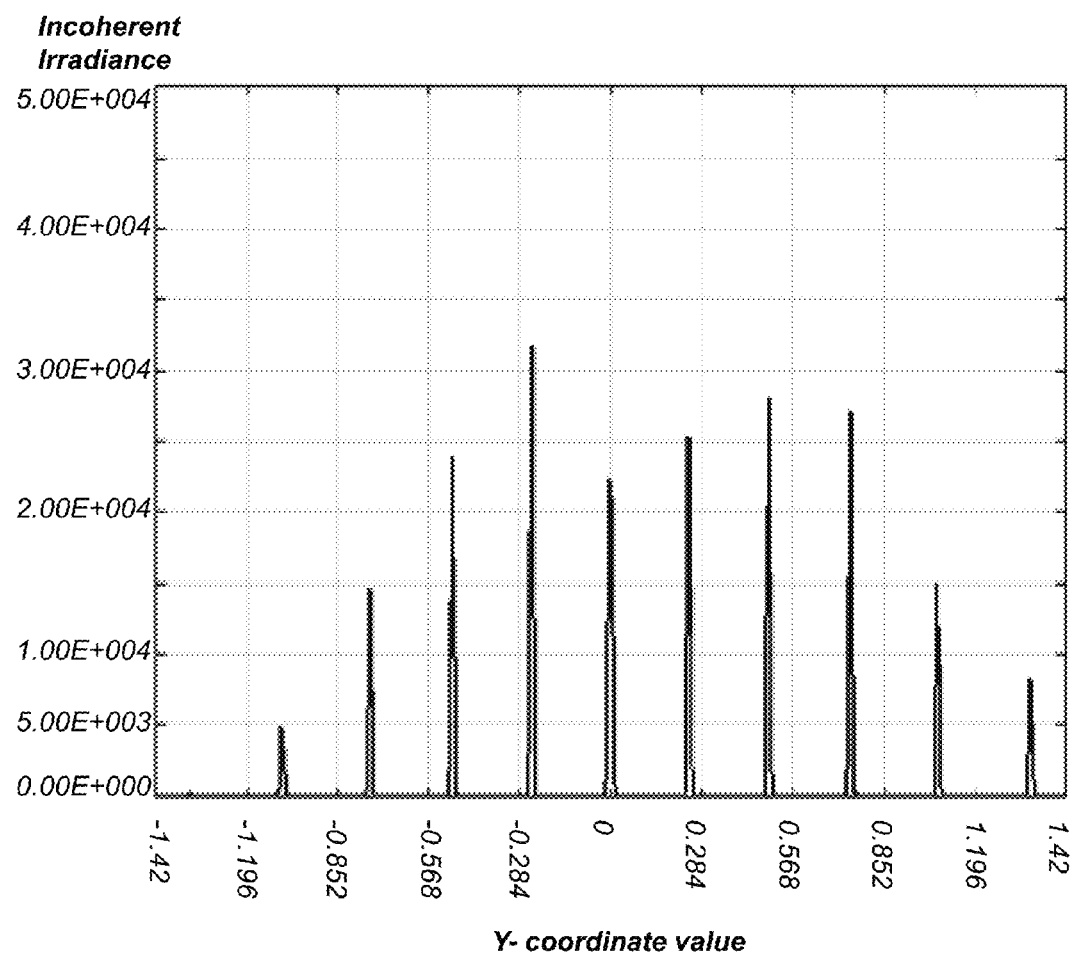
FIG. 4E is a graph that shows a non sequential ray trace that verifies calculated FOV values.

FIG. 4E shows a non sequential ray trace that verifies the calculated FOV values. The x direction in FIG. 4E is the sensor position in mm. At 1.42 mm, the semi full field angle for this example, using a camera with a focal length of 2.7 mm is 27°. The non sequential ray trace shown at the camera sensor is for 10° field angles separated by 5°.

Figure 5A:
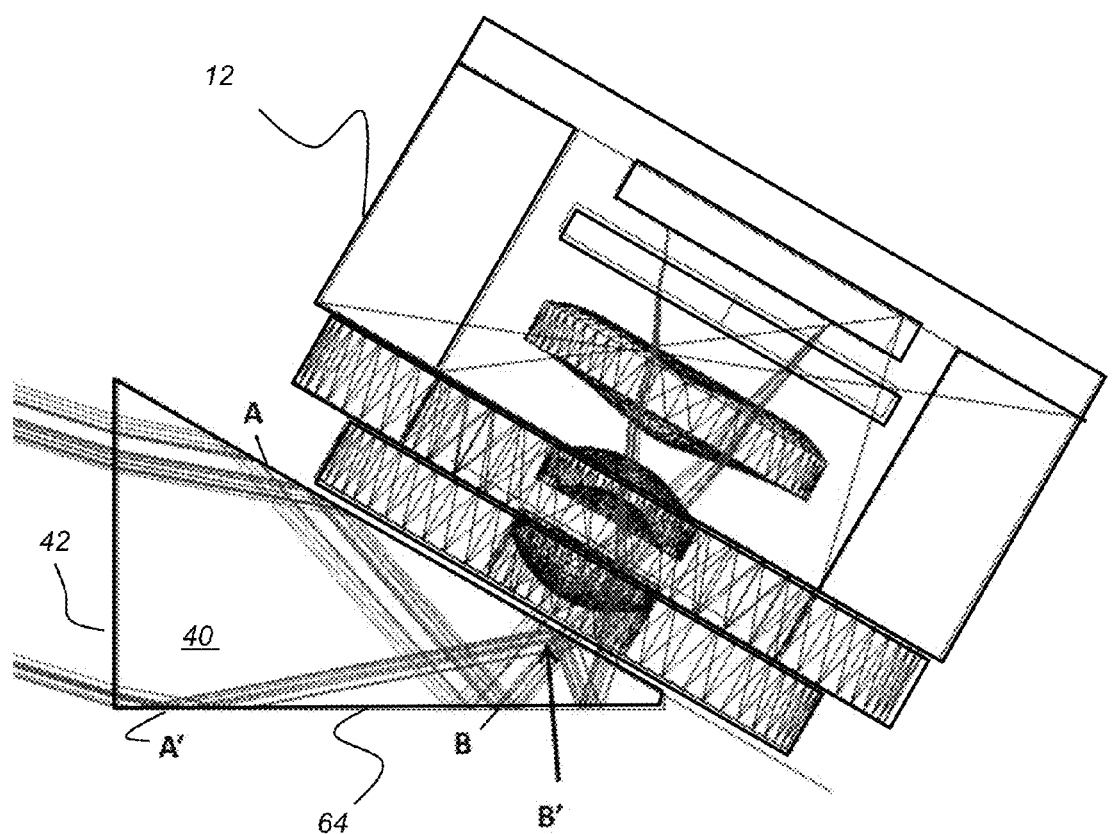
FIG. 5A shows the desired ray path and a ghosting ray path using the field of view deviator.
Figure 5B:
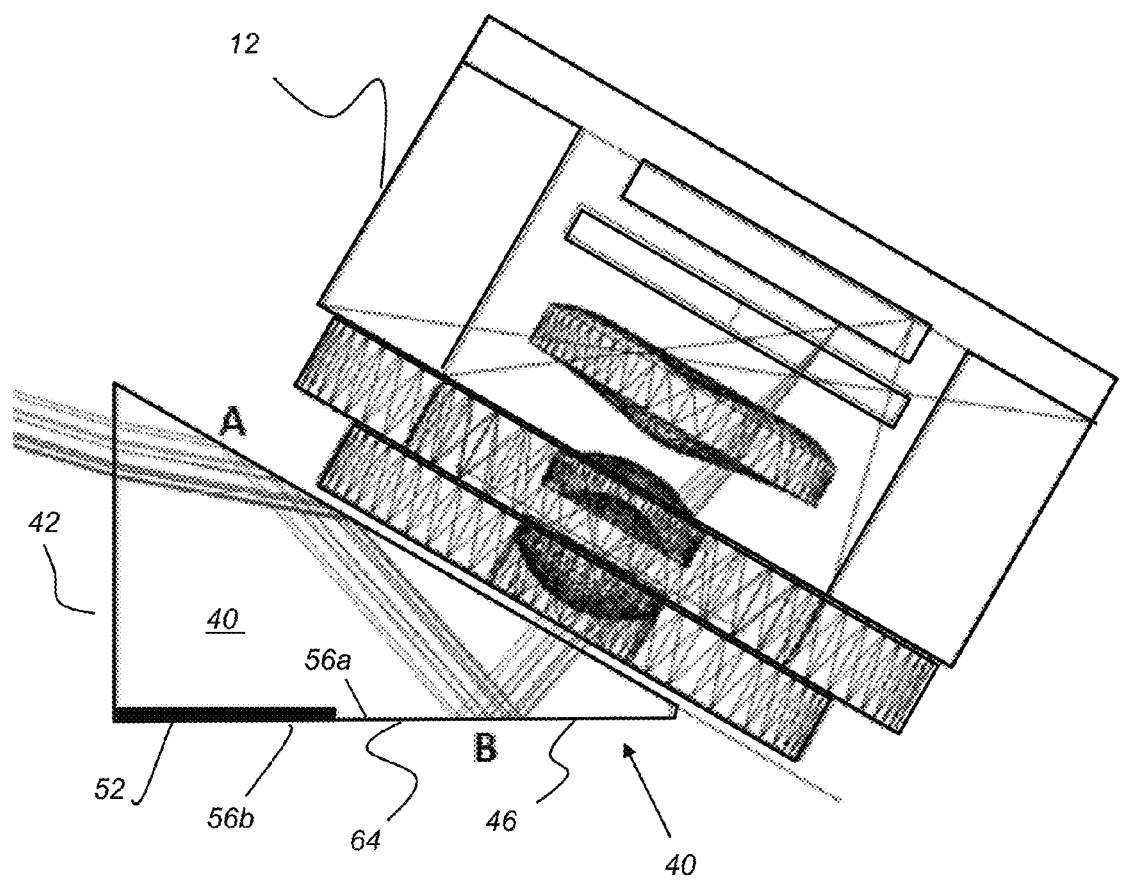
FIG. 5B shows correction that removes the ghosting ray path of FIG. 5A.

Ghosting can occur with field deviation if not properly eliminated. FIGS. 5A and 5B show another feature provided to eliminate ghosting for the Littrow prism of FIGS. 4A-4C. As shown in FIG. 5A, the desired ray path for imaging is shown at reflection points A and B. However, stray light along a secondary signal path, shown at points A' and B', generates a ghost image. FIG. 5B shows how this is corrected when using Littrow prism 64. A light-absorbing patch 52 is applied to a portion of bottom surface 46 that is adjacent to light entry surface 42 in order to eliminate the NB' beam. This added patch 52 modifies the conventional Littrow prism design and makes the corresponding partial portion of bottom surface 46 non-reflective, so that a partial portion 56a of bottom surface 46 is reflective and a partial portion 56b non-reflective, but does not affect the performance of the prism over the FOV.

Figure 4F:
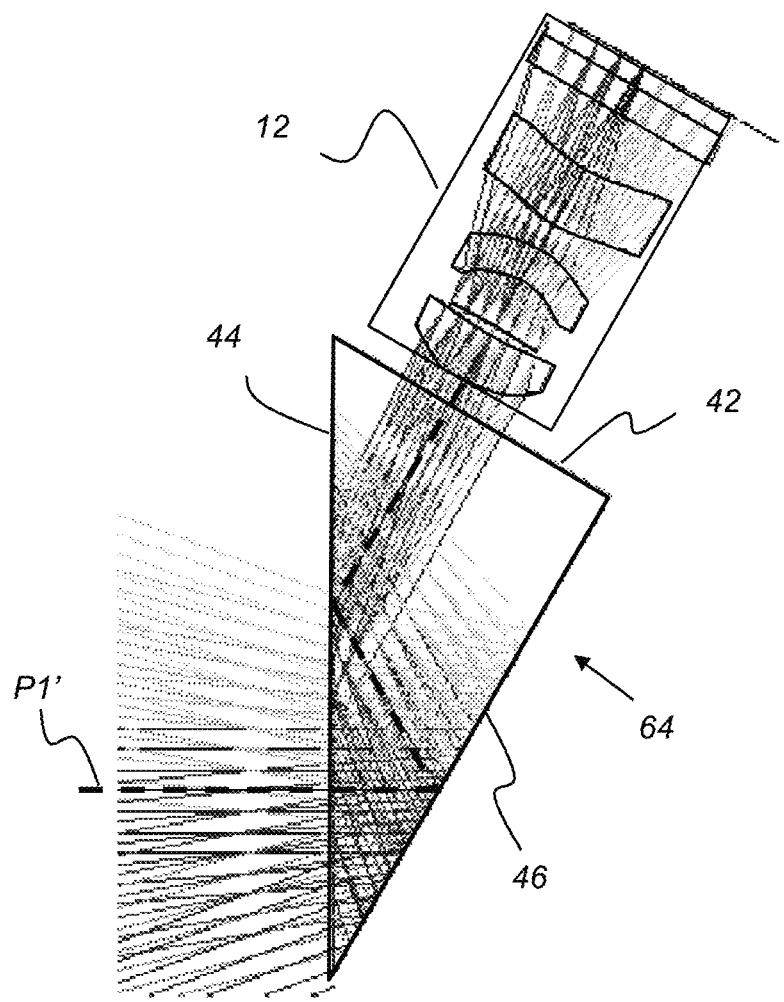
FIG. 4F is a schematic diagram that shows an alternate arrangement of the deviating prism, with reversed exit and entrance surfaces from that of FIG. 4B.

FIG. 4F shows an alternate positioning of the Littrow prism 64 wherein entry and exit surface use is reversed. On alternate path P1', transmissive surface 44 now acts as the entrance surface and transmissive surface 42 as the exit surface. Bottom surface 46 is again reflective. In this embodiment, along path P1', bottom surface 46 provides the first reflection for incident image-bearing light and surface 44, which is now the entry surface, provides TIR. Surface 42 is substantially at a normal to light path P1' at path incidence. While the performance of this configuration to that of the one on FIG. 4B is similar, this arrangement is less favorable since the prism 64 extends farther out from the front surface of camera 12.

Figure 6A:
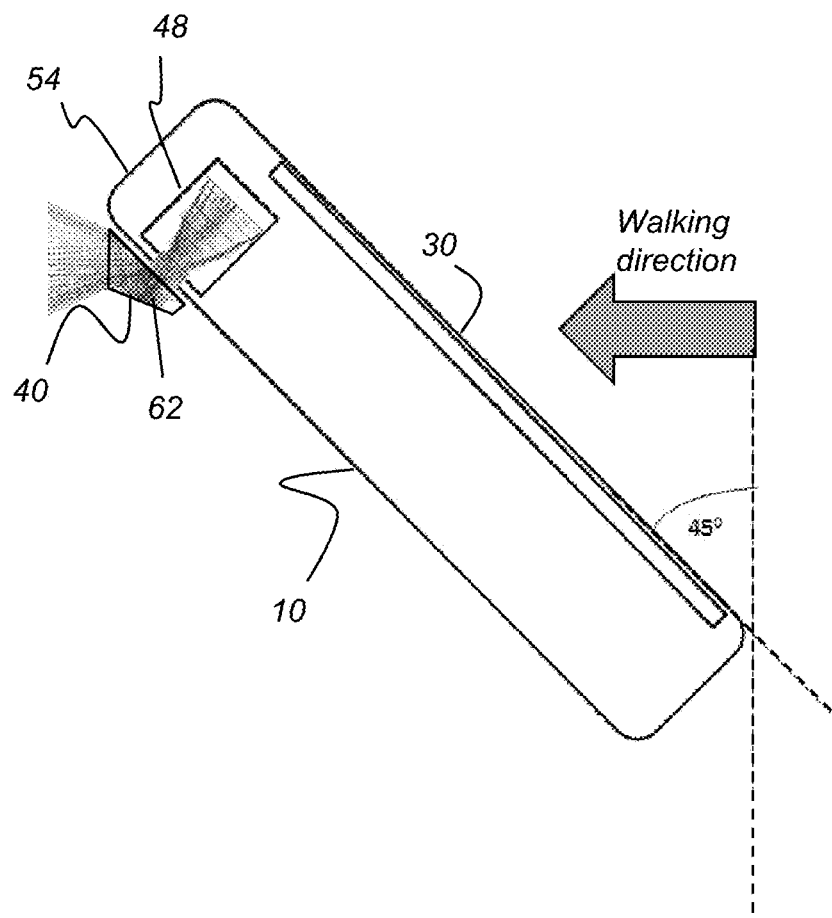
FIG. 6A is a side view of a personal communications device having a field of view deviator according to an alternate embodiment of the present disclosure.
Figure 6B:
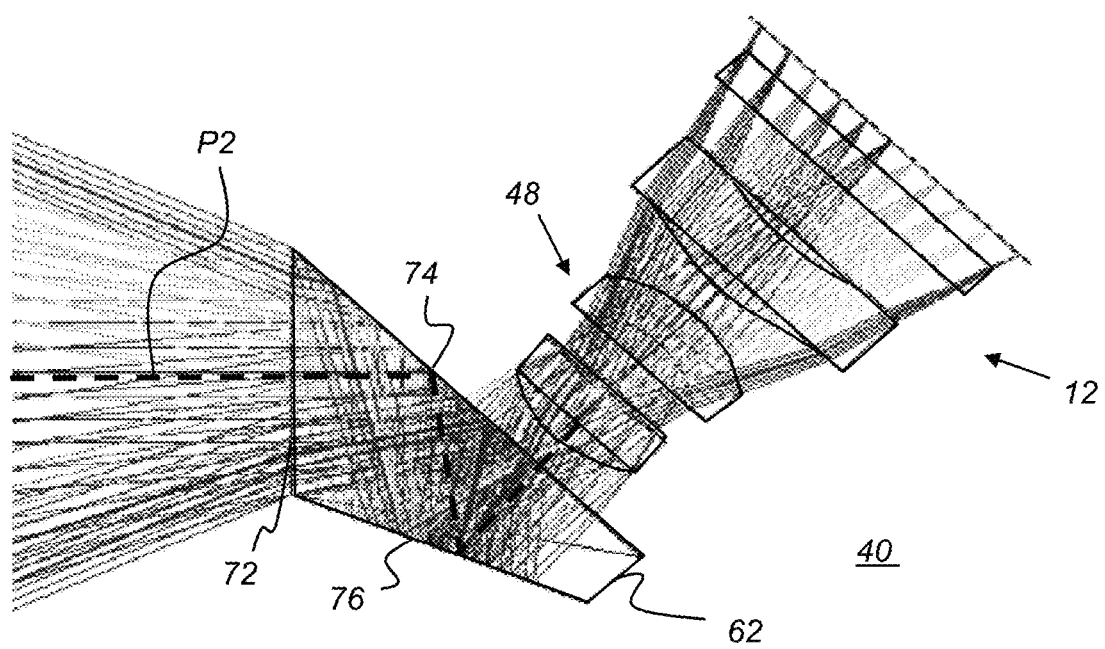
FIG. 6B is an enlarged side view that shows the field of view deviator as mounted in front of the camera lens.

According to an alternate embodiment of the present disclosure, a half-pentaprism 62 is used in field of view deviator apparatus 40 as shown in FIG. 6A and in enlarged form as disposed before camera lens 48 in FIG. 6B. The half-pentaprism 62 has the shape of a bisected pentaprism and is arranged with an entry surface 72, an exit surface 74, and a bottom surface 76 that is treated for reflection, such as coated with reflective material or with a multilayer dichroic reflector.

Half-pentaprism 62 can be configured as a suitable match for camera lenses such as that taught in the previously mentioned Dai et al. disclosure. The prism size is determined by the camera entrance pupil diameter and desired FOV. Advantageously, the half-pentaprism 62 does not introduce aberrations, since the incoming beams are essentially collimated. A prism entry surface 72 and exit surface 74 can be anti-reflection (AR) coated.

The half-pentaprism 62 deviates the field of view by 45 degrees, as indicated in FIG. 6A. Thus, the holding angle for personal communications device 10 outfitted with the half-pentaprism 62 in field of view deviator apparatus 40 is 45 degrees from vertical.

FIG. 6B shows a path P2 that is defined for image-bearing light from the subject scene S1 (FIG. 1) that is diverted toward camera 12 by field of view deviator apparatus 40 with half-pentaprism 62. Path P2 has two transmissive surfaces, entry and exit surfaces 72 and 74, and one reflective surface, bottom surface 76. As path P2 shows, there are two reflections of the image-bearing light by half-pentaprism 62 when used on field of view deviator apparatus 40. A first reflection is due to Total Internal Reflection (TIR) from exit surface 74. A second reflection is due to reflective material deposited on or applied against a portion of bottom surface 76, such as a mirrored coating or a multilayer dichroic coating, for example. Surface 74 is oblique to light path P2 at entry incidence for light from surface 72 and is substantially at a normal to light path P2 at exit incidence at surface 74.

Figure 6C:
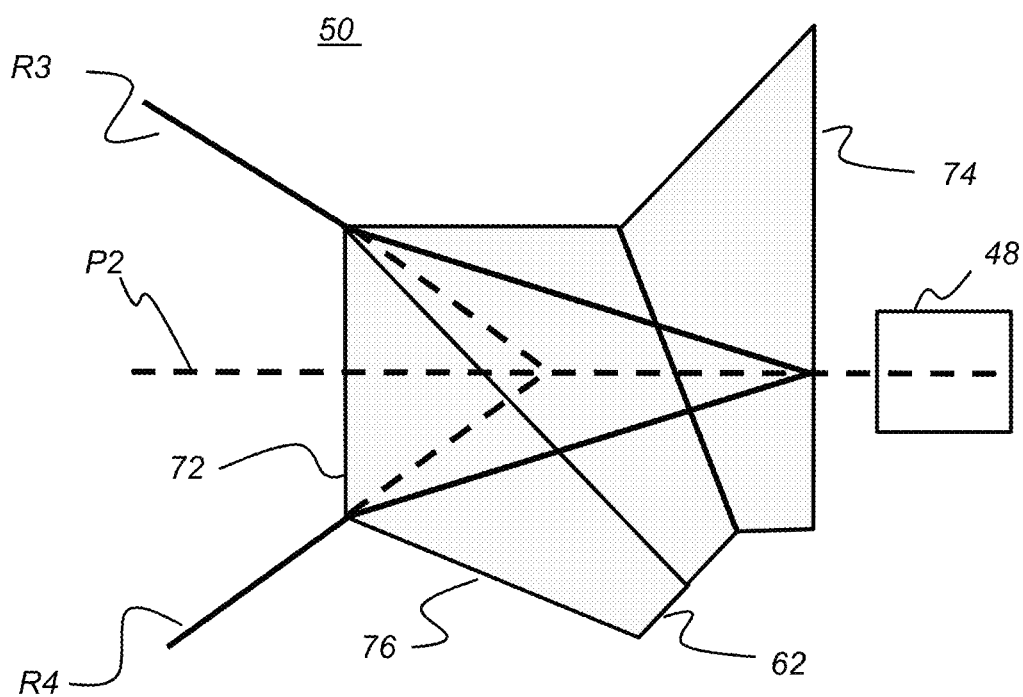
FIG. 6C is a tunnel diagram that shows a half-pentaprism used as the field of view deviator.

FIG. 6C shows a tunnel diagram 50 of the half-pentaprism 74 that is used to calculate the vertical FOV. Chief rays R3 and R4 indicate the 50% vignetting level of the FOV and are traced in diagram 50 as directed toward camera lens 48. The FOV of the half-pentaprism 62 depends, in part, on its refractive index n. With a high-index glass such as S-Lam66 with an index n of about 1.8, an FOV of almost 60.8 degrees can be achieved. With polystyrene, having index n close to 1.6, the FOV is about 53.5 degrees.

In similar fashion to the reversal shown for alternate use of the Littrow prism 64 in FIG. 4F, the half-pentaprism 62 can be also be re-oriented, effectively reversing the roles of entry and exit surfaces 72 and 74. With this change, surface 74 becomes an entry surface and surface 72 becomes an exit surface. As with Littrow prism 64, there are two transmissive surfaces for incoming and outgoing light and a reflective surface in prism 62; one of the transmissive surface only transmits, the other provides both transmission and TIR to the image-bearing light within the prism. The defined light path P2 is incident twice on one of the two transmissive surfaces.

The tunnel diagram 50 of FIG. 6C shows another advantage of the half-pentaprism design. With respect to the image-bearing light, entry surface 72 and exit surface 74 are optically parallel to each other, as the tunnel diagram 50 represents. This means that there would be no field-induced angular color dispersion or distortion. Unlike conventional prism-based redirection solutions that have been proposed, light that is incident at a normal to the light entry surface 72 of the field of view deviator apparatus along path P2 exits the field of view deviator apparatus at a normal to the light exit surface 74 of the field of view deviator apparatus.

The table in FIG. 6D shows calculated values of prism vertical field of view in air as a function of the prism refractive index for the half-pentaprism design of FIGS. 6A-6C.

Figure 7A:
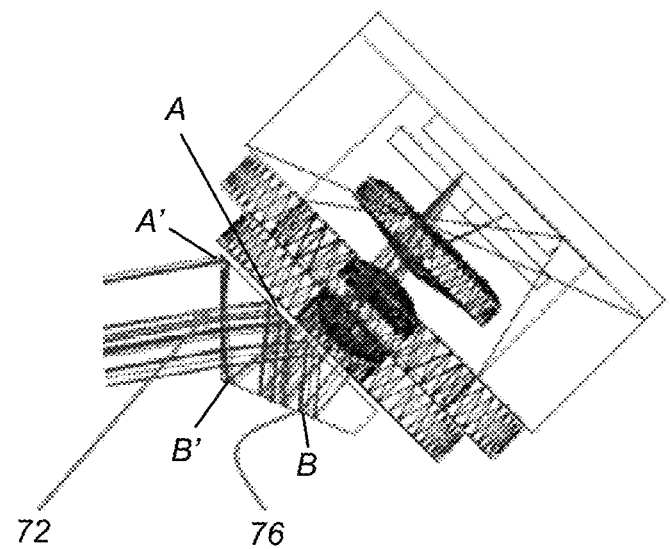
FIG. 7A shows the desired ray path and a ghosting ray path using the alternate field of view deviator of FIG. 6A.
Figure 7B:
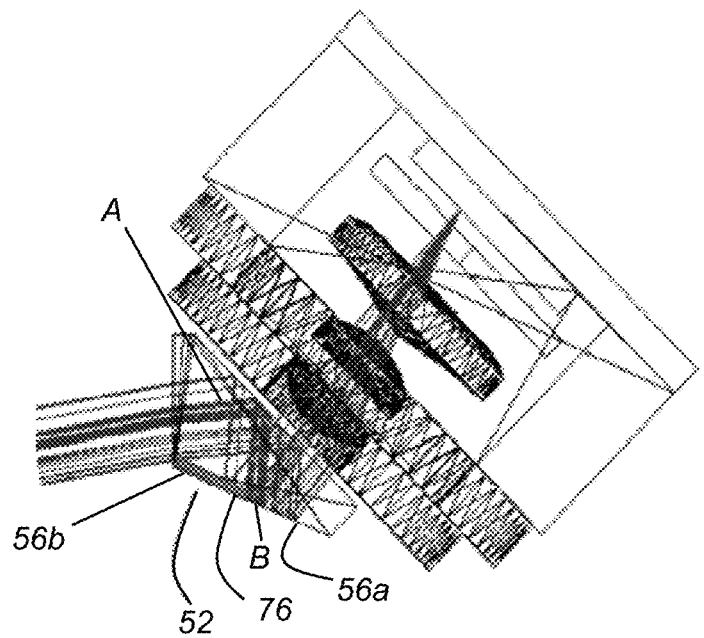
FIG. 7B shows correction that removes the ghosting ray path of FIG. 7A.

As with the Littrow prism 64 described earlier, the use of an erect-image prism such as the half-pentaprism 62 to deviate the FOV has the advantage of not altering the parity of the scene, so that software is not needed to correct for image parity and reconstruct the image so that it is right-side up. This is the case because the half-pentaprism provides an even number of reflections of image-bearing light. Two reflections are provided, as shown in FIG. 7B, at reflection points A and B. This distinguishes the half-pentaprism-based design of FIG. 7B from other types of prism designs as well as from extended mirrors.

Ghosting can occur with field deviation if not properly compensated. FIGS. 7A and 7B show another feature provided to eliminate ghosting for the half-pentaprism of FIGS. 7A and 7B. As was noted with respect to FIG. 7A, the desired ray path for imaging is shown at reflection points A and B. However, there is a secondary signal path, shown at points A' and B' that generates a ghost image as a result of an unwanted TIR reflection off surface 72. FIG. 7B shows how this is corrected. Light-absorbing patch 52 is applied to a partial portion 56b of bottom surface 76 that is adjacent to light entry surface 72 in order to eliminate the A'B' beam. This added patch 52 does not affect the performance of the prism over the FOV. Partial portion 56a of the surface 76 is reflective.

Coupling Arrangements for Seating Field of View Deviator 40

Figure 8A:
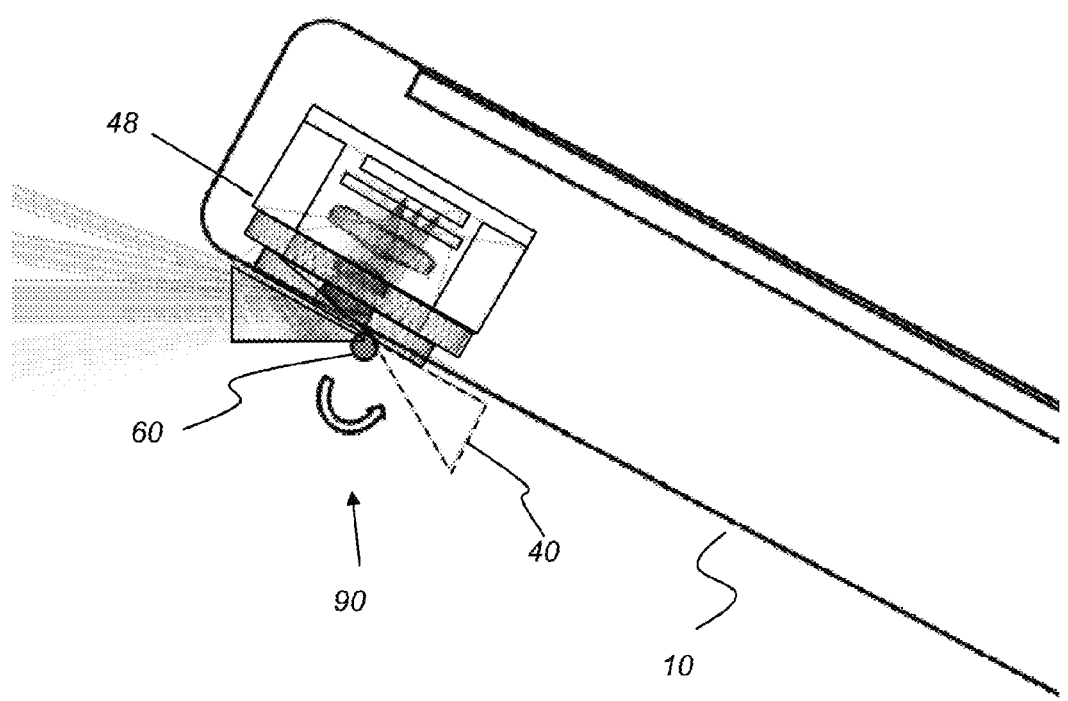
FIGS. 8A, 8B, and 8C show various mounting arrangements that can be used for a field of view deviator prism.

There are a number of possible mounting arrangements using couplings 90 that can be used for positioning field of view deviator apparatus 40 so that the prism is removably seated adjacent to the camera lens 48 when needed, helping to maintain a thin dimensional profile typical of cellular phones and other personal communications devices 10. The side view of FIG. 8A shows a hinge 60 that allows the viewer to pivot field of view deviator 40 into place.

Figure 8B:
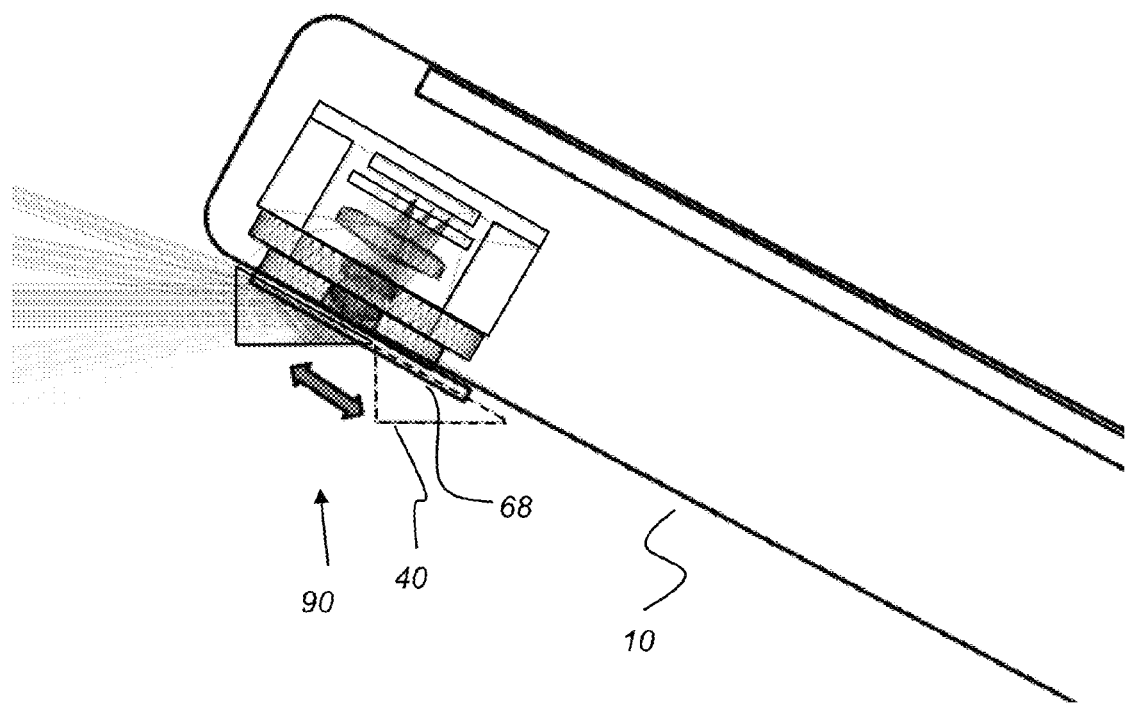

The side view of FIG. 8B shows coupling 90 as a slide 68 that seats field of view deviator 40 in either of two positions. Sliding can be performed in either of two orthogonal directions.

Figure 8C:
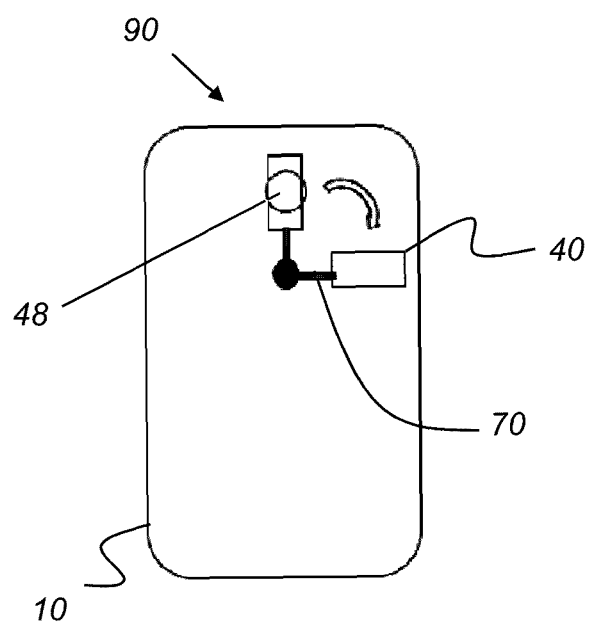

The rear side view of FIG. 8C shows field of view deviator apparatus 40 mounted along a rotatable arm 70 for positioning against lens 48.

Other options for seating the prism of field of view deviator apparatus 40 in place for temporary use include various arrangements using clips, bayonet mounts, magnetic attraction or magnetic fixtures, and other types of mounting apparatus. Field of view deviator apparatus 40 can have its prism removably seated in front of the lens by coupling 90 that uses any suitable type of restraining apparatus or force, including suction, pressure, adhesion, brackets, clips, or other fasteners or fittings. Coupling 90 can be built into the personal communications device 10 or its encasement or can be added or separately installed, including clipped on or otherwise fastened to personal communications device 10 when needed. Field of view deviator apparatus 40 can be retained so that it travels with personal communications device 10 and is simply removed or seated adjacent the camera lens when needed, sliding or rotating out of the way when not needed. Alternately, field of view deviator apparatus 40 is removable from the personal communications device 10, so that it can be separately stored and carried. According to an embodiment of the present disclosure, a bayonet mounting system is employed, such as that used in the iPRO Lens System by Schneider Optics, Van Nuys, Calif., or the bayonet system described in U.S. Pat. No. 8,687,299 to Sanford et al., for example.

It should be noted that the use of field of view deviator apparatus 40 in FIG. 4A for texting while walking uses the video imaging logic of the personal communications device 10 along with applications software that shares the display 30 between the acquired video and applications content. However, field of view deviator apparatus 40 can alternately be used for standard video imaging or for capturing still images with camera 12.

Figure 9A:
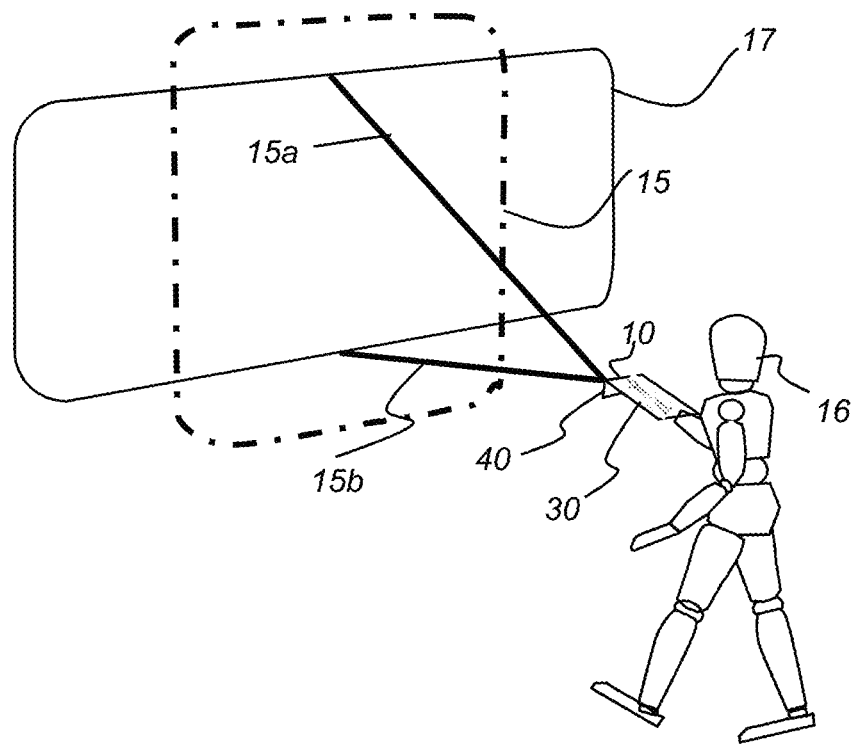
FIGS. 9A and 9B show the application of the field of view deviator in portrait imaging orientation.
Figure 9B:
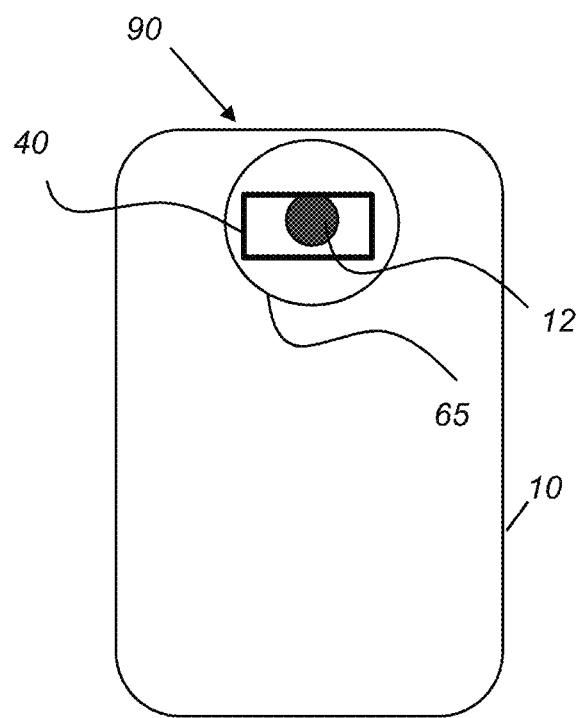

The field of view deviator apparatus 40 can alternately be rotated with respect to the optical axis to provide deviation along the short dimension of the field for either portrait or landscape image capture. FIGS. 9A and 9B show use of field of view deviator apparatus 40 in rotational position for imaging in the portrait mode, with the camera in the orientation that is conventionally used for texting. For portrait mode imaging, field of view deviator apparatus 40, for either the Littrow prism 64 or half-pentaprism 62, deviates the FOV in the vertical direction. The short dimension is in the horizontal direction. FIG. 9A further shows an FOV 15 of camera 12 and an FOV 17 of field of view deviator apparatus 40.

As described previously, the FOV of the prisms in the vertical direction is largely dependent on the index of refraction of the field of view deviator 40 prisms whereas the horizontal FOV of either prism is essentially unlimited and is dependent on the size of the prism in the horizontal direction. Thus in the portrait mode, the vertical FOV of the camera and field of view deviator apparatus 40 prism is limited in the vertical direction by the prism, and in the horizontal direction primarily by the camera. A rotatable mount 65 as shown in FIG. 9B enables prism rotation suitable for the portrait imaging orientation.

Figure 9C:
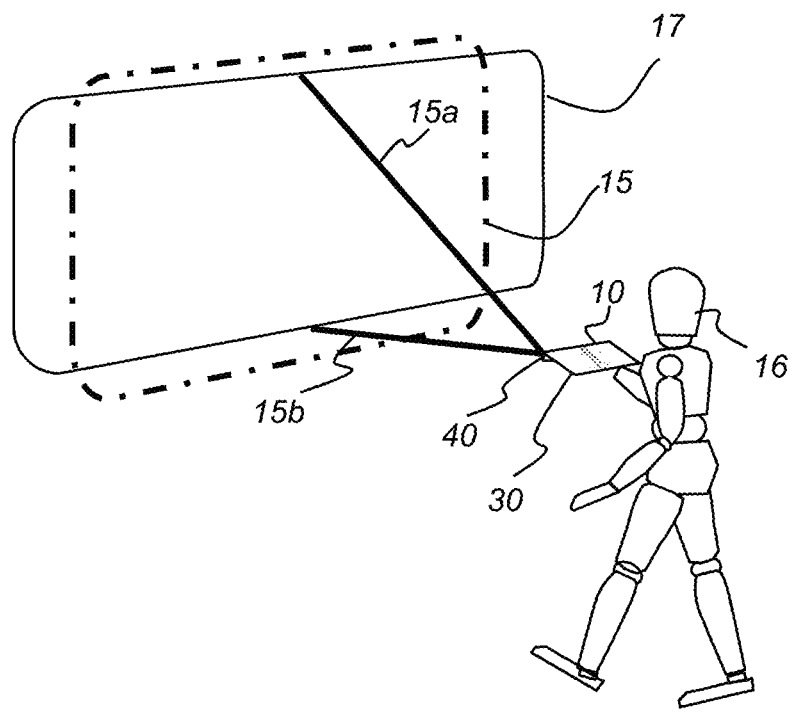
FIGS. 9C and 9D show the application of the field of view deviator in landscape imaging orientation.
Figure 9D:
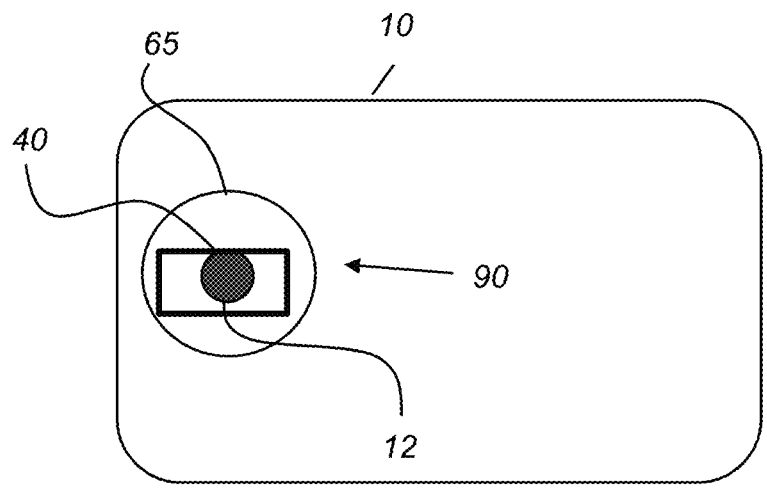

FIGS. 9C and 9D show the use of camera 12 in the landscape imaging mode, more commonly used for capture of still images. The longer side of the camera sensor is in the horizontal direction and the field of view deviator apparatus 40 prism deviates the FOV in the vertical direction. In this case the FOV of the camera and prism combination is limited in the vertical direction by the prism, as shown by lines 15 and 15b and in the horizontal direction, typically, by the camera. As shown in FIG. 9D, the field of view deviator apparatus 40 prism is rotated by 90 degrees from its portrait mode position in FIG. 9B. Rotatable mount 65 enables prism rotation suitable for the landscape imaging orientation.

Figure 10:
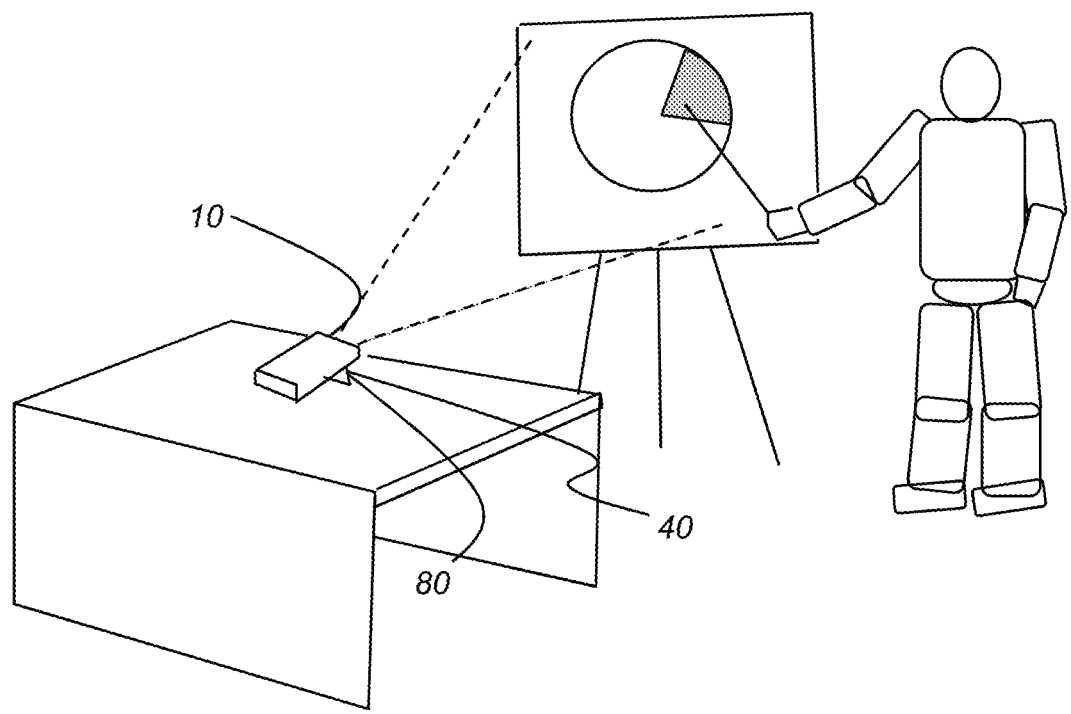
FIG. 10 shows the application of the camera with extended field of view deviator to allow hands-free image and video capture.

The field of view deviator apparatus 40 prism can alternately serve as a type of docking system or camera support for hands-free imaging using personal communications device 10. No tripod is needed. The perspective view of FIG. 10 shows personal communications device 10 supported for imaging on a table top or other horizontal surface. Personal communications device 10 is angled and aimed appropriately for imaging from a horizontal surface using an edge of prism 62 or 64 of field of view deviator apparatus 40 or using a supporting member 80 that is incorporated as part of the prism mount. This arrangement can enable a self-produced video presentation as well as a self-image or "selfie" in hands-free mode.

While prisms used as field of view deviators are shown having flat surfaces, some optical power can be provided to these devices using surface curvature, such as to provide panoramic or "fish eye" lenses along at least one axis. For example, a surface of the prism could be glued to a plano-convex lens or to other types of lenses. Numerous attachment devices can be used, including devices that add a cover or clip to the personal communications device.

Figure 11:
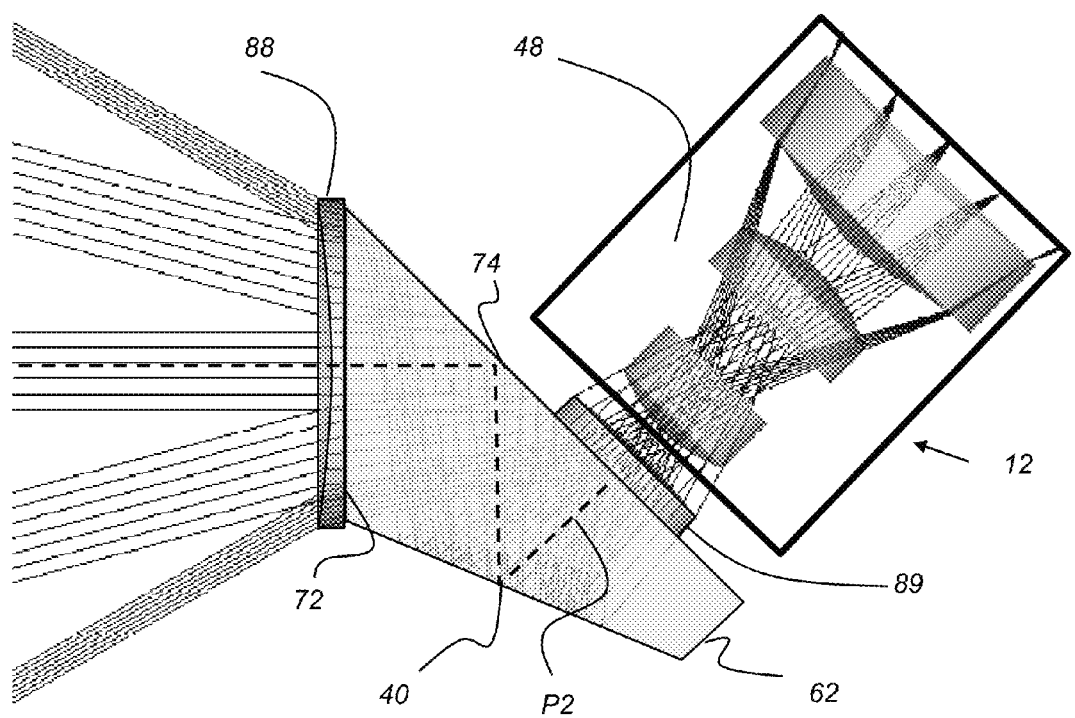
FIG. 11 shows the use of the camera and field of view deviator with an anamorphic lens pair to increase the FOV.

The schematic view of FIG. 11 shows the half-pentaprism 62 with a negative lens 88 cemented to its entry surface 72 and a positive lens 89 cemented to its exit surface 74. The combination with prism 62 sandwiched between two lenses 88 and 89 forms an afocal anamorphic pair which increases the FOV of the system compared with the prism 62 with flat (plano) surfaces as shown in FIG. 6B. This same type of anamorphic pair can be similarly applied to the Littrow prism 64 of FIG. 4B. The negative-positive lens combination provides a type of reverse Galilean telescope arrangement for increasing the FOV.

The invention has been described with reference to a preferred embodiment; however, it will be appreciated that variations and modifications can be effected by a person of ordinary skill in the art without departing from the scope of the invention.

What is claimed is:

1. A field of view deviator apparatus for a camera lens housing on a personal communications device, comprising:
   a coupling that seats a removable element in a position adjacent to the camera lens; and
   a field of view deviator prism that seats in the coupling and defines a path for image-bearing light from a subject scene to the camera lens having:
   (i) a first transmissive surface that is at a sufficiently oblique angle to the defined path of image-bearing light within the prism for total internal reflection,
   (ii) a second transmissive surface that is substantially at a normal to the defined path of incident image-bearing light within the prism; and
   (iii) a first reflective surface that folds the defined path of image-bearing light within the prism
   wherein a partial portion of the first reflective surface adjacent to the first or second transmissive surface is further treated to absorb reflected light.

2. The apparatus of claim 1 wherein the first reflective surface has a multilayer dichroic coating.

3. The apparatus of claim 1 wherein the field of view deviator prism is a Littrow prism.

4. The apparatus of claim 1 wherein the field of view deviator prism is a half-pentaprism.

5. The apparatus of claim 1 wherein the path for image-bearing light defined within the deviator prism provides an even number of reflections.

6. The apparatus of claim 1 where the field of view deviator prism is rotatable about an optical axis of the camera to allow image capture in either a portrait or a landscape orientation.

7. The apparatus of claim 1 further comprising a lens cemented to the first transmissive surface.

8. The apparatus of claim 1 wherein one of the first and second transmissive surfaces is an entry surface for incoming light from a subject scene being imaged and the other transmissive surface is an exit surface for outgoing light from the deviator prism, and wherein the defined path for image-bearing light is at a normal for both incoming light at the entry surface and outgoing light at the exit surface.

9. The apparatus of claim 1 further comprising a negative lens cemented to one of the first and second transmissive surfaces and a positive lens cemented to the other of the first and second transmissive surfaces.

10. A field of view deviator apparatus for a personal communications device, the field of view deviator apparatus comprising a field of view deviator prism that is removably positionable in a coupling against a recessed camera lens along a surface of the personal communications device, wherein the field of view deviator prism has:
    (i) a light entry surface that is disposed to receive incident light from a subject scene;
    (ii) a light exit surface that is disposed to direct the incident light from the light entry surface toward a bottom surface by total internal reflection;
    (iii) wherein a first partial portion of the bottom surface is treated to reflect, toward the light exit surface, incident light that is obtained from total internal reflection against the light exit surface and
    wherein a second partial portion of the bottom surface adjacent to the light entry surface is further treated to absorb reflected light.

11. The apparatus of claim 10 wherein the first partial portion of the bottom surface has a multilayer dichroic coating.

12. The apparatus of claim 10 wherein the field of view deviator prism is a Littrow prism.

13. The apparatus of claim 10 wherein the field of view deviator prism is a half-pentaprism.

14. The apparatus of claim 10 wherein light that is incident at a normal to the light entry surface of the field of view deviator apparatus exits the field of view deviator apparatus at a normal to the light exit surface of the field of view deviator apparatus.

15. A personal communications device comprising:
    a camera having a recessed lens in a lens housing along a surface of the personal communications device;
    a field of view deviator apparatus that comprises a field of view deviator prism for the camera lens housing on the personal communications device,
    wherein the field of view deviator prism is removably positionable within a coupling over the camera lens housing on the personal communications device and defines a path for image-bearing light from a subject scene to the camera lens having:
    (i) a first transmissive surface that is at a sufficiently oblique angle to the path of the image-bearing light within the field of view deviator prism for total internal reflection;
    (ii) a second transmissive surface that transmits incident light from the subject scene;
    (iii) a first reflective surface having a first partial portion that is further treated to absorb reflected light;
    and
    a display that is energizable to show the subject scene captured by the camera.

16. The personal communications device of claim 15 wherein the display is further configurable to display the subject scene captured by the camera with variable transparency.

17. The personal communications device of claim 15 wherein the display is further configurable to display the subject scene captured by the camera on a first portion of the display and to display other content on a second portion of the display.

18. The personal communications device of claim 15 wherein the device is further configurable to display the subject scene captured by the camera on a first portion of the display during text entry using a second portion of the display.

19. The personal communications device of claim 15 wherein the coupling for the field of view deviator prism is a hinge.

* * * * *